US012711300B2

(12) United States Patent
Garg et al.

(10) Patent No.: US 12,711,300 B2
(45) Date of Patent: Aug. 18, 2026

(54) METHOD AND SYSTEM FOR USE WITH AN ELECTRONIC DESIGN AUTOMATION (EDA) TOOL TO OPTIMIZE CLOCK SCHEDULING

(71) Applicant: Texas Instruments Incorporated, Dallas, TX (US)

(72) Inventors: Atul Garg, Bangalore (IN); Venkatraman Ramakrishnan, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 697 days.

(21) Appl. No.: 18/103,859

(22) Filed: Jan. 31, 2023

(65) Prior Publication Data

US 2024/0256754 A1 Aug. 1, 2024

(51) Int. Cl.

*G06F 30/30* (2020.01)
*G06F 1/10* (2006.01)
*G06F 30/396* (2020.01)
*G06F 30/398* (2020.01)
*G06F 111/04* (2020.01)

(52) U.S. Cl.

CPC .............. *G06F 30/398* (2020.01); *G06F 1/10* (2013.01); *G06F 30/396* (2020.01); *G06F 2111/04* (2020.01)

(58) Field of Classification Search

CPC ........ G06F 30/398; G06F 1/10; G06F 30/396; G06F 2111/04; G06F 2119/12; G06F 30/327

See application file for complete search history.

(56) References Cited

U.S. PATENT DOCUMENTS 8,205,182 B1 * 6/2012 Zlatanovici ........... G06F 30/327 716/113
9,053,281 B2 * 6/2015 Ma ........................ G06F 30/323
11,914,939 B1 * 2/2024 Gupta ........................ G06F 1/10
2010/0235802 A1 * 9/2010 Singasani ............. G06F 30/394 716/126
2014/0289690 A1 * 9/2014 Chopra ................. G06F 30/396 716/113
2014/0289694 A1 * 9/2014 Ma ...................... G06F 30/3312 716/129
2022/0335197 A1 * 10/2022 Hsu ....................... G06F 30/392

* cited by examiner

*Primary Examiner* — Jack Chiang
*Assistant Examiner* — Brandon Bowers
(74) *Attorney, Agent, or Firm* — Michelle F. Murray; Frank D. Cimino

(57) ABSTRACT

A method and computer-implemented system for use with an electronic design automation (EDA) tool to optimize clock scheduling. Based on an initial timing and area optimized design for a logic circuit, an optimal set of clock anchor points on a clock tree for the logic circuit, and slack statistics for a plurality of elements in the logic circuit, are determined. Clock skews for the CAPs associated with the plurality of elements are then scheduled as a function of the slack statistics. A refined timing and area optimized design for the logic circuit is generated based on the clock skews, and the refined timing and area optimized design is utilized as input to a clock tree synthesis module of the EDA tool.

20 Claims, 7 Drawing Sheets

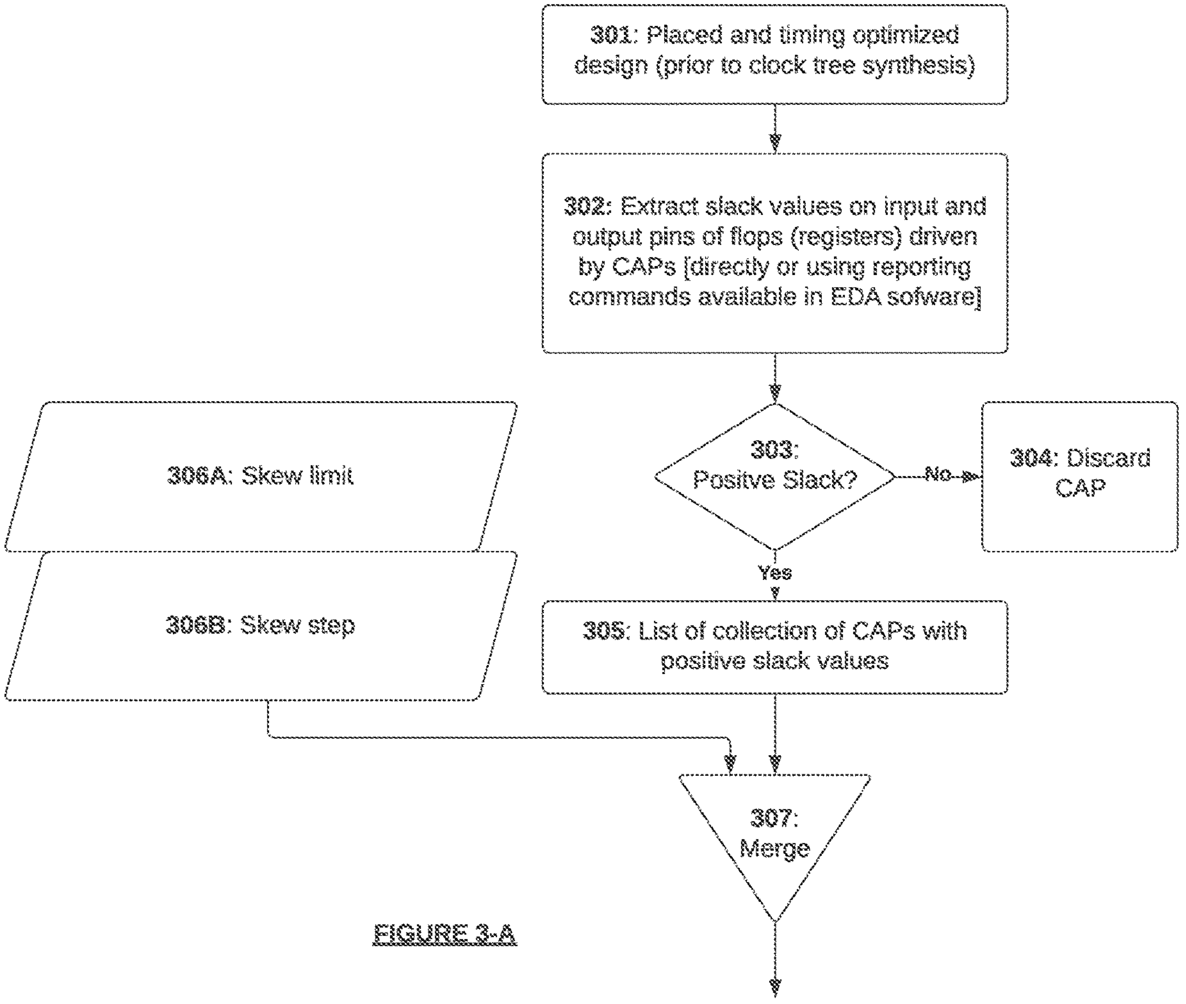
FIGURE 3-A

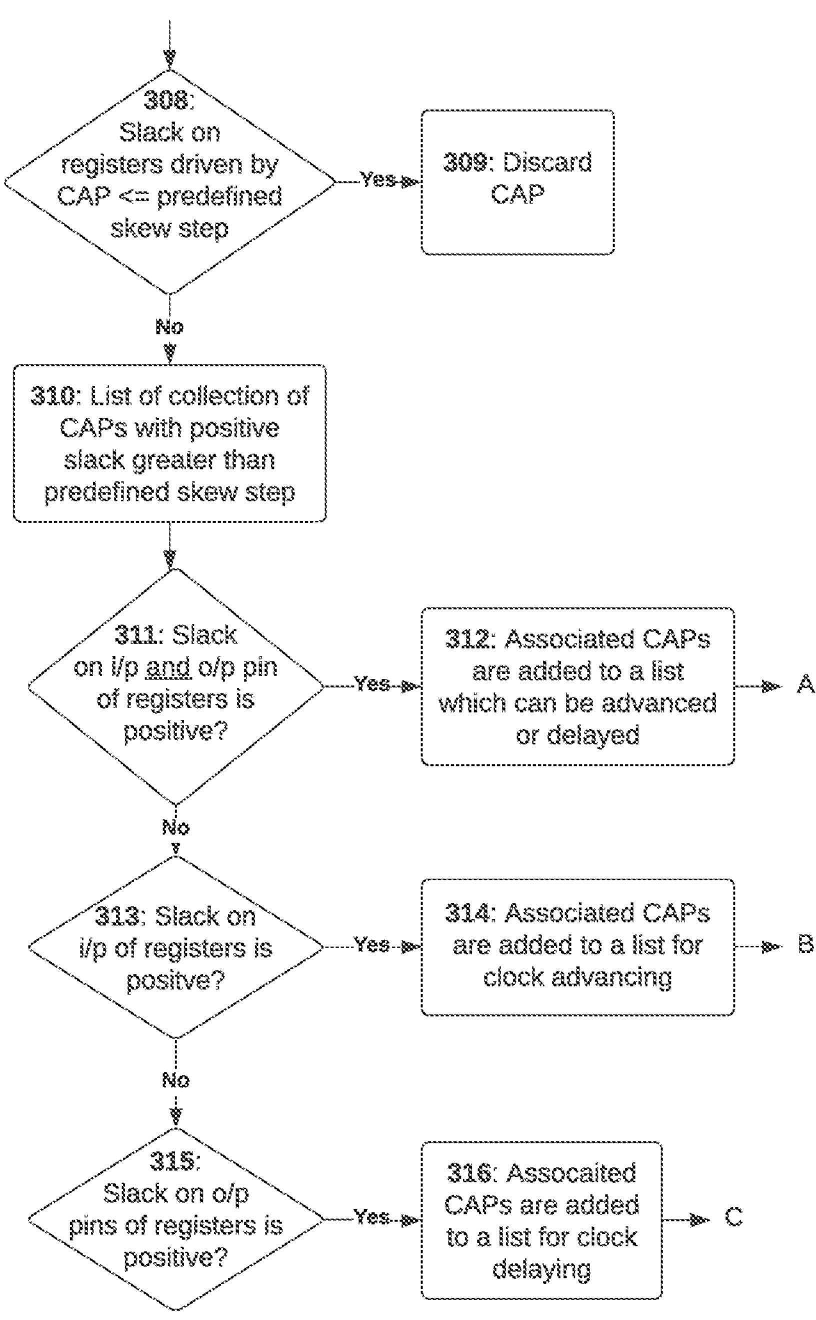
FIGURE 3-B

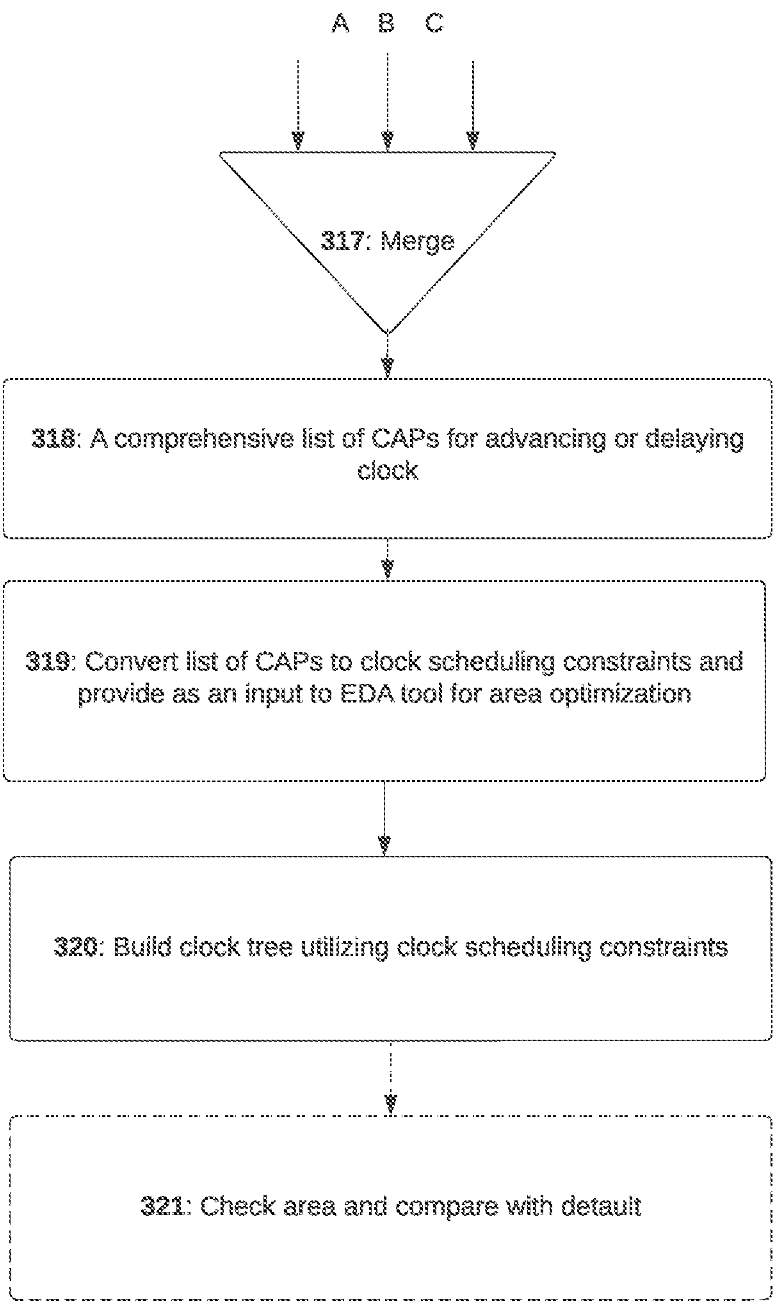
FIGURE 3-C

METHOD AND SYSTEM FOR USE WITH AN ELECTRONIC DESIGN AUTOMATION (EDA) TOOL TO OPTIMIZE CLOCK SCHEDULING

TECHNICAL FIELD

The disclosure relates, in general, to electronic design automation (EDA) and, more specifically, to a method for optimizing clock scheduling for logic circuits.

BACKGROUND

Area is an important factor in deep sub-micron very large scale integration (VLSI), which is the process of creating an integrated circuit (IC) by combining millions, or even billions, of transistors onto a single chip; wafer area determines both manufacturing costs and influences production yields. In addition, a reduction in IC area can also lead to substantial power savings.

Digital logic circuit area constitutes a significant portion of IC design area, and clock signals are required to properly synchronize actions of the digital circuits. As ICs become more complex, the problem of supplying accurate and synchronized clocks to all the circuit elements becomes increasingly difficult. Proper design of the clock distribution network helps ensure that critical timing requirements are satisfied. So-called "skews" in clock-trees have historically been used to improve design timing/performance; traditional approaches target for global zero skew in the process of timing closure costs in area and power. While electronic design automation (EDA) tools strive to optimize design area and power, clock skew analysis is generally restricted to only address critical design timing.

SUMMARY

In order to address certain deficiencies in the prior art, disclosed hereinafter are a method and computer-implemented system for use with an electronic design automation (EDA) tool to optimize clock scheduling. The disclosed method of clock scheduling can be utilized to optimize design logic area without impacting other design parameters of interest like timing and power.

In general, an initial timing and area optimized design for a logic circuit is determined; in one example, determining an initial timing optimized design comprises querying an EDA database containing output data from a place and router phase of an EDA tool. Based on the initial design, an optimal set of clock anchor points (CAPs) on a clock tree for the logic circuit, and slack statistics for a plurality of elements in the logic circuit, are determined; the plurality of elements can be, for example, a group of registers. Clock skews for the CAPs associated with the plurality of elements are then scheduled as a function of the slack statistics. A refined timing and area optimized design for the logic circuit is generated based on the clock skews, and the refined timing and area optimized design is utilized as input to a clock tree synthesis module of the EDA tool.

In one example, the slack statistics comprise slack values on the inputs and outputs of each group of registers, and the step of scheduling clock skews comprises determining a clock skew value for a clock anchor point (CAP), with a goal of maintaining a positive slack on the input and output of each said group of registers. Each CAP associated with a group of registers having positive slack values are preferably added to a list of candidates for which a clock signal can be advanced or delayed. Whether a clock signal for each CAP on the list of candidates should be advanced or delayed can be determined as a function of a predefined skew limit and a predefined skew step. A skew limit is a function of the technology and the logic circuits utilized for a logic function; for some technologies, as an example, the skew limit is on the order of 3 to 4 times the delay of one buffer circuit. A skew step, which is a fraction of the skew limit, is equal to a minimum unit of skew that can be supported by the technology. Any CAPs associated with a group of registers having a slack value less than the predefined skew step are preferably deleted from the list of candidates. In related embodiments, CAPs associated with registers having positive slack on both the input and output are added to a first list of CAPs for which the clock signal can be advanced or delayed; CAPs associated with registers having positive slack on only the input are added to a second list of CAPs for which the clock signal can be advanced; and, CAPs associated with registers having positive slack on only the output are added to a third list of CAPs for which the clock signal can be delayed. The first, second and third lists are then converted to clock scheduling constraints for the EDA tool; the clock scheduling constraints serve as inputs to the step of generating a refined timing and area optimized design for the logic circuit based on the clock skew. Finally, a clock tree for the logic circuit is built as a function of the clock scheduling constraints.

BRIEF DESCRIPTION OF THE DRAWINGS

Particular embodiments in accordance with the invention will now be described, by way of example only, and with reference to the accompanying drawings, wherein:

FIG. 3, comprising partial FIGS. 3-A, 3-B and 3-C, illustrates an exemplary flowchart of a method for use with an EDA tool to optimize clock scheduling of logic circuits;

DETAILED DESCRIPTION

Figure 1:
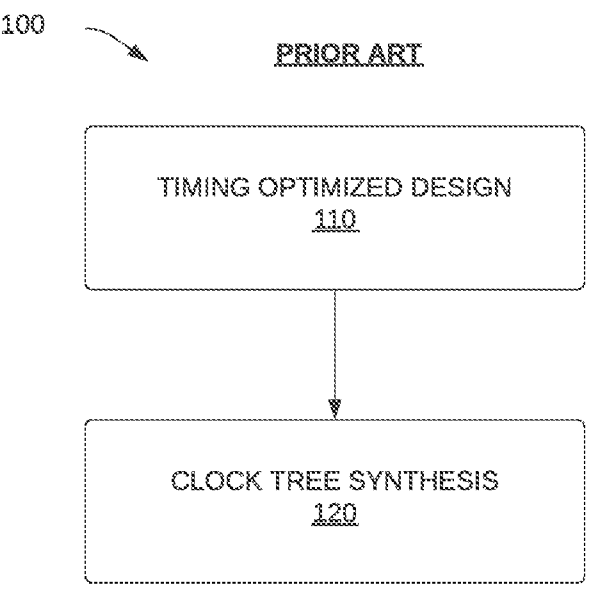
FIG. 1 illustrates a flowchart of certain functionality of a prior art electronic design automation (EDA) tool.

FIG. 1 illustrates a flowchart 100 of certain functionality of a prior art electronic design automation (EDA) tool. An EDA tool typically comprises one or more design flows to accomplish the design of an IC. In a conventional EDA tool, a timing optimized IC design 110 is directly input to a clock tree synthesis tool 120, which generates the clock circuitry necessary to properly clock the logic elements throughout the IC. It has been recognized by the inventors, however, that significant improvements can be made to the final IC design if certain design constraints, based on the initial timing optimized design, are also provided as input to the clock tree synthesis tool 120. Prior art methodology 100 did not provide these design constraints as an input to the clock tree synthesis tool 120. Additional example details of EDA tools can be found in commonly assigned U.S. Patent Application Publication No. 2021/0255682, entitled "Boundary Port Power Intent Modeling and Management," filed Jan. 25, 2021, and U.S. Patent Application Publication No. 2022/0083718, entitled "Simulation Framework," filed Aug. 3, 2021, each of which is incorporated by reference in its entirety.

Figure 2:
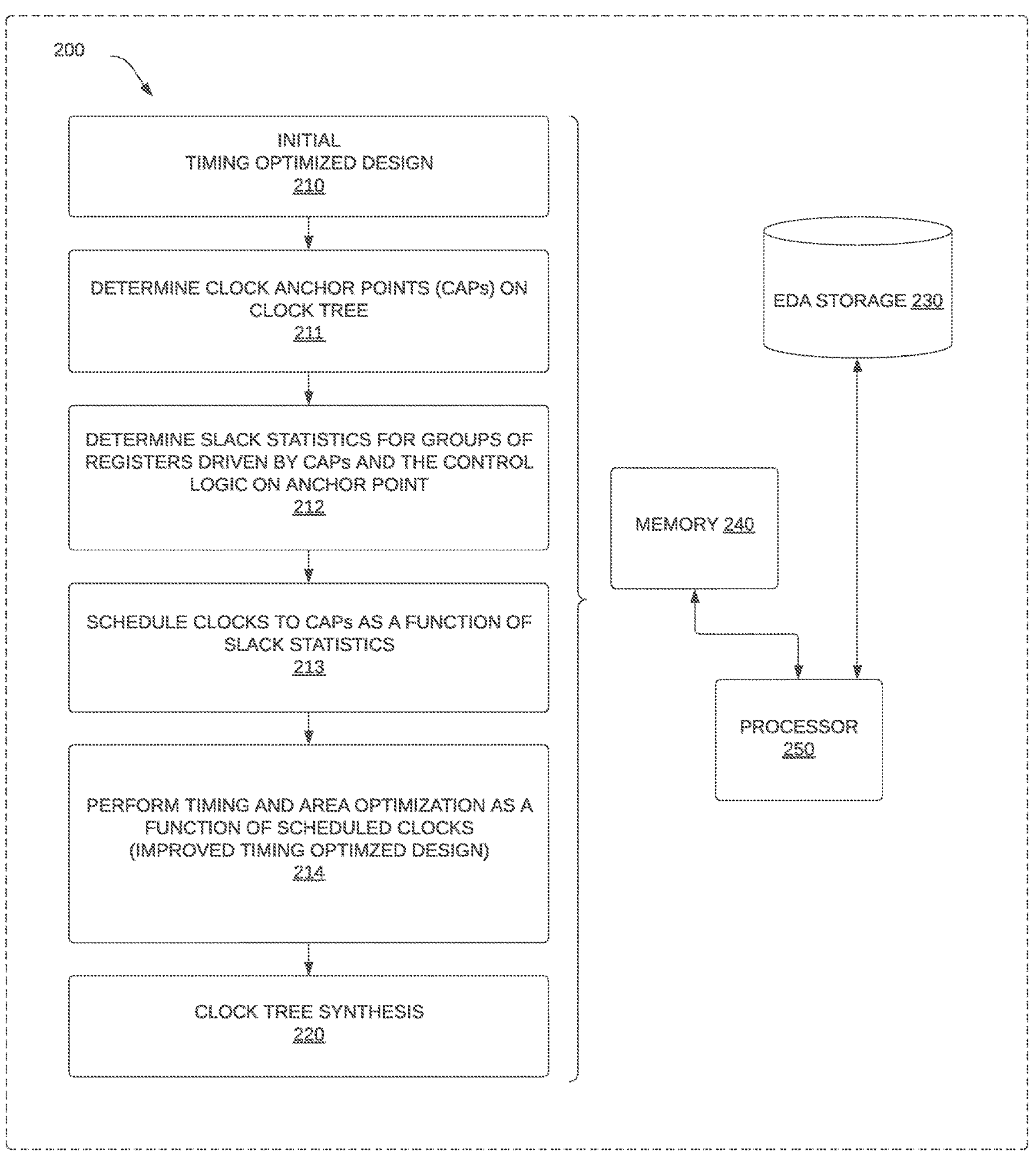
FIG. 2 illustrates a block schematic of a computer-implemented system, and a general flowchart of a method operable therein, for use with an EDA tool to optimize clock scheduling of logic circuits.

Referring now to FIG. 2, illustrated is a block schematic of a computer-implemented system, and a general flowchart of a method 200 operable therein, for use with an EDA tool to optimize clock scheduling of logic circuits by defining relative clock arrival times across different branches of a clock tree. The system includes a processor 250 and a memory 240; the memory contains instructions which, when executed by the processor, are operative to perform the functions of the method generally defined by the flowchart 200; a more detailed exemplary methodology is illustrated, and described with reference to, FIG. 3, hereinafter. The processor 250 also is coupled to, or has access to, EDA storage 230, which can be a database containing initial, intermediate, and/or final design parameters for an IC.

This disclosure attributes functionality to the EDA tool and processor 250, which may include one or more processors. The EDA tool may include any combination of integrated circuitry, discrete logic circuitry, analog circuitry, such as one or more microprocessors, microcontrollers, digital signal processors, application specific integrated circuits, central processing units, graphics processing units, field-programmable gate arrays, and/or any other processing resources. In some examples, the EDA tool may include multiple components, such as any combination of the processing resources listed above, as well as other discrete or integrated logic circuitry, and/or analog circuitry.

The techniques described in this disclosure may also be embodied or encoded in an article of manufacture including a non-transitory computer-readable storage medium, such as memory 240. Example non-transitory computer-readable storage media may include random access memory (RAM), read-only memory (ROM), programmable ROM, erasable programmable ROM, electronically erasable programmable ROM, flash memory, a solid-state drive, a hard disk, magnetic media, optical media, or any other computer readable storage devices or tangible computer readable media. The term "non-transitory" may indicate that the storage medium is not embodied in a carrier wave or a propagated signal. In certain examples, a non-transitory storage medium may store data that can, over time, change (e.g., in RAM or cache).

The disclosed method to schedule clocks (i.e., define relative clock arrival times across different branches of the clock tree) utilizes positive slacks on timing paths effectively to target improvement in design area. The method implements the schedules efficiently by defining the skew steps on existing clock tree elements, such as Integrated Clock Gates (ICGs), hereinafter called Clock Anchor Points (CAPs), thus not impacting the area costs of clock schedule implementation. The skew schedules are used with conventional design optimization capabilities in EDA tools to concurrently optimize timing, power and area.

The focus of identifying CAPs, defining clock skews is on like the leaf clock-gates (i.e., ICGs) that exist in the design, is to reduce the number of scheduling points for the clock tree construction. For example, ICGs are preferred rather than on the individual registers that are driven by the ICGs. The number of clock-gates is at least an order of magnitude smaller than the number of individual registers, thus improving the effectiveness of skew scheduling. Skewing on such anchor points causes the least perturbance to regular clock tree synthesis, so the area increase in the clock tree can be minimal, if at all.

In general examples, the slack profile of endpoints (i.e., registers) are captured from a timing optimized design. Next, clocks are "scheduled" (i.e., assign skew intent) to the CAPs based on comprehending the timing slacks of the registers driven by such CAPs, with a goal to maximize available positive slack for area improvement. Timing endpoints are profiled considerably into the positive slack regime, increasing the available positive slack, prioritized based on logic cone size; larger positive slacks on larger logic cones improves the potential for area improvement using standard techniques like cell sizing, local netlist restructuring, etc.

According to a general method 200, an EDA tool is used to generate an initial timing optimized design 210 (analogous to timing optimized design 110 in the prior art methodology 100); conventional EDA tools store the design parameters for the initial timing optimized design in a database, illustrated as EDA storage 230. The subsequent steps in method 200 depend on knowledge of certain data contained in EDA storage 230 for the initial timing optimized design. Some vendors of EDA tools, however, utilize proprietary EDA storage systems, which may be locked or otherwise not directly accessible by an end user. Without direct access to the contents of EDA storage 230, an end user can typically utilize certain EDA tool queries to determine the parameters from the EDA database 230 necessary to perform the subsequent steps of method 200; in one example, the desired parameters of the initial timing optimized design are output data from a place and router phase of the EDA tool. The queries of the EDA storage 230 can, for example, be performed manually by an end user or, alternatively, programmatically using a custom-designed application or script.

Based on an initial timing optimized design 210, the novel functionality disclosed herein begins with step 211, wherein the EDA tool determines clock anchor points (CAPs) on a clock tree for the logic circuit of the timing optimized design. CAPs may include integrated clock gating (ICG) cells used to stagger switching of flip flops in a timing aware fashion. Each CAP may be configured to drive one or more circuit elements such as registers by delivering a clock signal to the one or more elements. Next, in a step 212, slack statistics for a plurality of elements in the logic circuit are determined; in one example, the elements can be one or more groups of registers (e.g., endpoints), and the slack statistics are the slack values on the inputs and outputs of each group of registers. The number of CAPs may be at least an order of magnitude smaller than the number of individual registers, which can improve the speed of skew scheduling. Based on the slack statistics, in step 213 clock skews are scheduled for the CAPs associated with each of the plurality of elements (e.g., groups of registers). Next, in step 214, the EDA tool performs a timing and area optimization as a function of the scheduled clocks, which will yield an improved timing optimized design. The improved timing optimized design is then provided as input to a clock tree synthesis process 220, which is the same as clock tree synthesis 110 in the prior art method 100, except with the additional clock scheduling constraints provided as input.

Turning now to FIG. 3, comprising drawings 3-A, 3-B and 3-C, illustrated is a second, more detailed, flowchart 300 of a method for use with an EDA tool to optimize clock scheduling of logic circuits; each of the steps in flowchart 300 corresponds to at least one of the steps in the general methodology 200 illustrated in FIG. 2. Beginning with step 310, a placed and timing optimized design is determined, as previously described with respect to step 210; this initial optimized design is prior to the process of clock tree synthesis (analogous to step 110 of prior art method 100). Next, in step 302, slack statistics for a plurality of elements in the logic circuit are determined; in this example, the slack statistics are the slack values on the inputs and outputs of each register, or groups of registers, driven by CAPs; as described supra, these statistics can be determined from the EDA storage 230 (e.g., directly, if the database is unlocked or otherwise accessible, or indirectly, using manual or programmatic queries).

Having knowledge of the slack statistics, each CAP associated with a register, or group of registers, and having at least one positive slack value can be added to a list of candidates for which a clock signal can be advanced or delayed during the subsequent phase of building a clock tree. In one example, if a CAP does not have positive slack on an input or output (step 303), then the CAP is discarded as a candidate (step 304); otherwise, if one or both the input or output has positive slack, then the CAP is added to a collection of CAPs with positive slack values (step 305). The list of collected CAPS with at least one positive slack value is then merged (step 307) with parameters that define a predefined skew limit 306A and a skew step 306B. The skew limit 306A is a function of the technology and the logic circuits utilized for a logic function; for some technologies, as an example, the skew limit is on the order of 3 to 4 times the delay of one buffer circuit. The skew step 306B, which is a fraction of the skew limit, is equal to a minimum unit of skew that can be supported by the technology.

The EDA tool may be configured to increase the positive slack to achieve an area improvement. The EDA tool may also be configured to profile timing end-points into the positive slack regime, increasing the available positive slack, prioritized based on logic cone size. Larger positive slacks on larger logic cones can improve the potential for area improvement using, for example, cell sizing and local netlist restructuring.

Based on the list of CAPS with at least one positive slack value and the predefined skew limit 306A and skew step 306B, subsequent steps are then performed to determine whether a clock signal for each CAP on the list of candidates should be advanced or delayed as a function of the predefined skew limit 306A and the predefined skew step 306B; one example of determining the candidates which can be advanced, delayed, or either, is illustrated by steps 308 through 318. First, in step 308, it is determined whether the slack on registers driven by a CAP is less than or equal to the predefined skew step 306B. If so, the EDA tool discards the CAP as a candidate (step 309), thereby winnowing the original list of candidates to those with positive slack values greater than the predetermined skew step (step 310). Next, in step 311, it is determined whether the slack on the input and output pins of registers on the remaining list of candidates are both positive; if so, the EDA tool adds those CAPs to a list of candidates (312) which can be advanced or delayed, and the original list of candidates is reduced to those for which the slack on both the input and output are not positive. Next, in step 313, it is determined whether the slack on the input pins of registers on the remaining list of candidates are positive; if so, the EDA tool adds those CAPs to a list of candidates (314) which can be advanced (but not delayed). Similarly, in step 315, it is determined whether the slack on the output pins of registers on the remaining list of candidates are positive; if so, those CAPs to a list of candidates (316) which can be delayed (but not advanced). The lists of candidates which can be advanced or delayed (312), only advanced (314), or only delayed (316) are then merged in step 317 to create a comprehensive list 318 of CAPs for advancing or delaying; the list of CAPs, based on their capability to be advanced or delayed are then converted to clock scheduling commands, or constraints, in step 319, and are then provided as input to build the clock tree for the logic circuit as a function of the clock scheduling constraints (step 320).

In an optional step 321, the final IC design utilizing the clock scheduling constraints can be compared against a baseline design (e.g., designed according to the prior art methodology illustrated in FIG. 1) to determine the areal and power advantages. In an exemplary comparison of an optimized design utilizing the methodology disclosed herein and a baseline design (based on 65 nm technology and having a gate count of 1.8 million and 100,000 registers, with 5300 CAPs), a 2.9% area gain and 4.28% power gain were realized.

Figure 4:
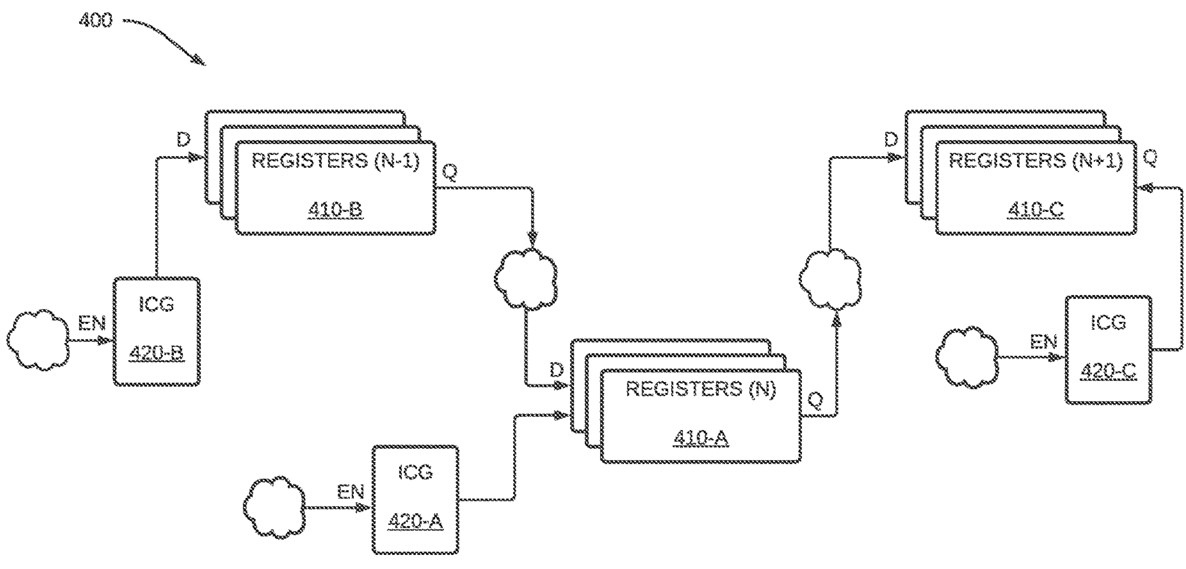
FIG. 4 illustrates an exemplary logic circuit for comprehending the principles disclosed herein; and, FIG. 5 illustrates application of the principles disclosed herein to optimize clock scheduling in a logic circuit.

Referring now to FIG. 4, illustrated is an exemplary logic circuit 400 for comprehending the principles disclosed herein. The logic circuit 400 includes a plurality of elements, such as groups of registers 410-A, 420-B and 410-C; each register has an input D and output Q, and each group of registers has a common clock anchor point, such as an ICG (420-A, 420-B and 420-C, respectively. Each ICG includes an enable input (EN).

An ICG cell can be utilized to manage clock skew to the groups of registers; and, thus, can be a CAP. Clock skew is a phenomenon in digital circuits in which a clock signal arrives at different components at different times due to gate or, in more advanced semiconductor technologies, signal propagation delay. The instantaneous difference between the readings of any two clocks is called their skew.

The operation of most digital circuits is synchronized by a periodic signal known as a "clock" that dictates the sequence and pacing of the devices in the circuit. Typically, a clock signal is distributed from a single source to all the memory elements of the circuit, which can be, for example, registers or flip-flops. In a circuit using edge-triggered registers, when the clock edge or "tick" arrives at a register, the register transfers the register input to the register output, and these new output values flow through combinational logic to provide the values at register inputs for the next clock tick. Ideally, the input to each memory element reaches its final value in time for the next clock tick so that the behavior of the whole circuit can be predicted exactly. The maximum speed at which a system can run must account for the variance that occurs between the various elements of a circuit due to differences in physical composition, temperature, and path length.

Clock skew can be caused by many different things, such as wire-interconnect length, temperature variations, variation in intermediate devices, capacitive coupling, material imperfections, and differences in input capacitance on the clock inputs of devices using the clock. As the clock rate of a circuit increases, timing becomes more critical and less variation can be tolerated if the circuit is to function properly. There are two types of clock skew: negative skew and positive skew. Positive skew occurs when the receiving register receives the clock tick later than the transmitting register. Negative skew is the opposite: the transmitting register gets the clock tick later than the receiving register. Zero clock skew refers to the arrival of the clock tick simultaneously at transmitting and receiving register.

According to the disclosed method, statistics of slacks on groups of registers (such as 410-A, 410-B and 410-C) driven by corresponding ICGs (i.e., 420-A, 420-B and 420-C) are first derived. For the example in FIG. 4, registers in each group (i.e., group N (410-A), group N−1 (410-B), and group N+1 (410-C)) need to be scheduled in the clock domain. Slacks on $D_i$ (input) & $Q_i$ (output) of all registers and the clock-enable input EN of each ICG are collected, and the scheduling is preferably performed according to the principles that:

Min{$D_i$, EN} is the maximum value by which an ICG can be scheduled early (advanced)

Min {$Q_i$} is the maximum value by which an ICG can be scheduled late (delayed)

An example of the maximum skew limit is half the slack available. Half of the two "Min" values is used for defining allowed scheduling range (early and late); this ensures that the design does not see new timing violations when multiple ICGs are concurrently "scheduled".

ICGs which have slack profiles near to zero are considered for clock skewing to target the logic area reduction, and skew distribution across ICGs can be prioritized based on logic cone size.

Figure 5:
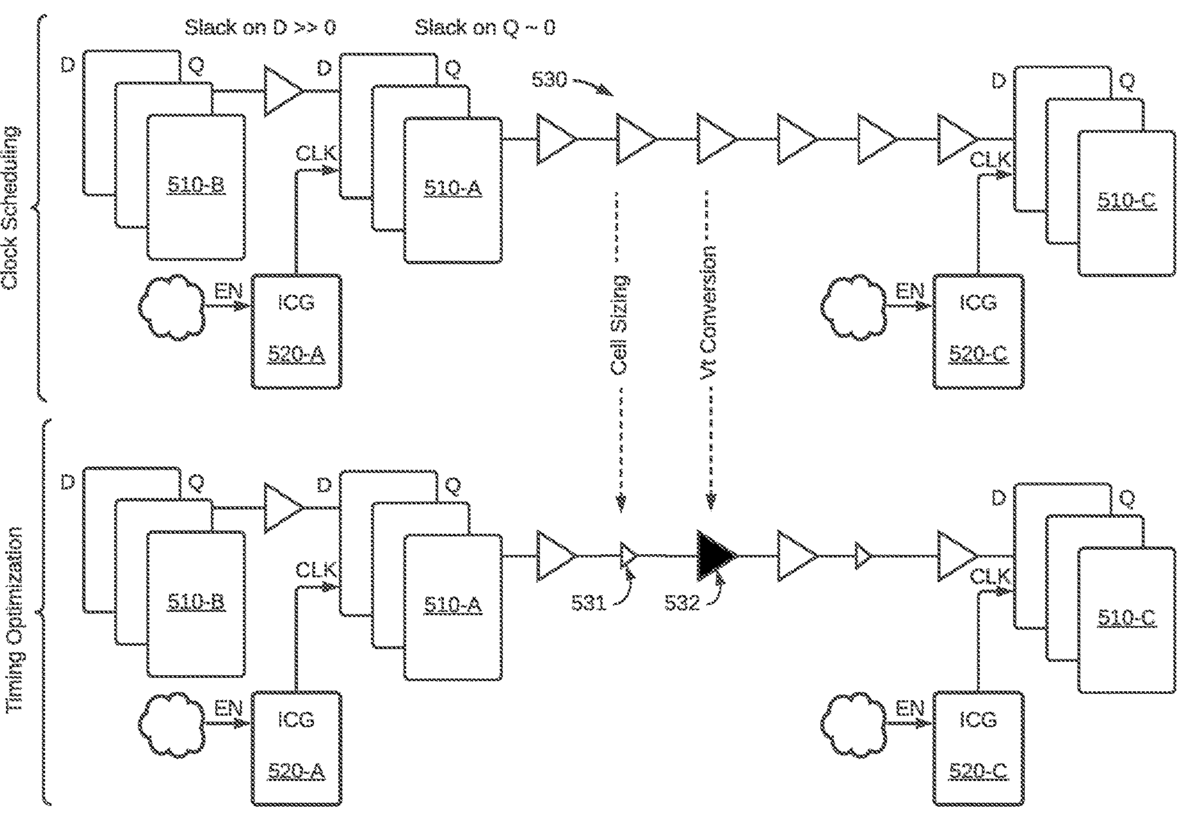

Finally, reference is made to FIG. 5, which illustrates application of the principles disclosed herein to optimize clock scheduling in a logic circuit; the upper portion of the figure illustrates a clock scheduling phase and the lower portion a timing optimization phase. A data path of interest is from register group 510-A to register group 510-B; the data path includes a plurality of logic cells generally designated 530. As described with respect to FIG. 4, the timing slack on D pins of registers driven by clock anchor points (i.e., ICGs 520-A, 520-C) are determined to be positive (i.e., slack on D>0), and the clock signal to those registers can be advanced using clock anchor points. Based on knowledge of the advanced clock skew constraints, the EDA tool can the perform efficient timing optimization of the logic circuit as shown in bottom portion of FIG. 5. During the timing optimization process, the EDA tool can convert one or more of larger logic cells 530 to smaller logic cells (e.g. 531), which helps in reducing the overall area of design; the EDA tool can also convert a high leakage cell to a low leakage cell (e.g., 532), known in the art as Vt conversion, to gain leakage power.

The technical principles disclosed herein provide a foundation for defining clock skews to improve overall logic circuit area. The method to use existing elements (such as ICGs) on a clock tree to alleviate the cost incurred conventionally in implementing clock skews can lead to an improvement in area and improve the overall power, and hence power density, in an IC design. The examples presented herein illustrate the application of the technical principles and are not intended to be exhaustive or to be limited to the specifically disclosed system or methods of operation.

We claim:

1. A method comprising:

determining a first design for a logic circuit;

determining a set of clock anchor points (CAPs) on a clock tree for the logic circuit based on the first design;

determining slack values on inputs and outputs of a plurality of groups of registers in the logic circuit;

scheduling clock skews for the CAPs associated with the plurality of groups of registers by determining slack values for the inputs and outputs of the plurality of groups of registers;

adding CAPs associated with groups of registers having positive slack values to a list of candidates;

generating a second design for the logic circuit based on the list of candidates; and utilizing the second design as input to a clock tree synthesis module of an electronic design automation (EDA) tool.

2. The method of claim 1, wherein determining the first design comprises querying an EDA database containing output data from a place and router phase of the EDA tool.

3. The method of claim 1, further comprising advancing or delaying candidates on the list of candidates.

4. The method of claim 3, further comprising determining whether a clock signal for each CAP on the list of candidates should be advanced or delayed based on a maximum skew limit and a skew step.

5. The method of claim 4, further comprising deleting from the list of candidates CAPs associated with a group of registers having a slack value less than the skew step.

6. The method of claim 3, further comprising:

adding CAPs associated with registers having positive slack on both the input and the output to a first list of CAPs for which the clock signal can be advanced or delayed;

adding CAPs associated with registers having positive slack on only the input to a second list of CAPs for which the clock signal can be advanced; and adding CAPs associated with registers having positive slack on only the output to a third list of CAPs for which the clock signal can be delayed.

7. The method of claim 1, further comprising converting the list of candidates to clock scheduling constraints for the EDA tool, the clock scheduling constraints serving as inputs to generating the second design for the logic circuit based on the clock skews.

8. The method of claim 7, further comprising building a clock tree for the logic circuit based on the clock scheduling constraints.

9. A system comprising:

a processor; and a memory storing instructions which, when executed by the processor, cause the processor to:

determine a first design for a logic circuit;

determine a set of clock anchor points (CAPs) on a clock tree for the logic circuit based on the first design;

determine slack values on inputs and outputs of a plurality of groups of registers in the logic circuit;

schedule clock skews for the CAPs associated with the plurality of groups of registers by determining slack values for the inputs and outputs of the plurality of groups of registers;

add CAPS associated with groups of registers having positive slack values to a list of candidates;

generate a second design for the logic circuit based on the list of candidates; and utilize the second design as input to a clock tree synthesis module of an electronic design automation (EDA) tool.

10. The system of claim 9, wherein determining the first design comprises querying an EDA database containing output data from a place and router phase of the EDA tool.

11. The system of claim 9, the memory further storing instructions to cause the processor to advance or delay candidates on the list of candidates.

12. The system of claim 11, the memory further storing instructions to cause the processor to determine whether a clock signal for each CAP on the list of candidates should be advanced or delayed based on a maximum skew limit and a skew step.

13. The system recited in claim 12, further comprising instructions operative to delete from the list of candidates any CAPs associated with a group of registers having a slack value less than the skew step.

14. The system of claim 13, the memory further storing instructions to cause the processor to:

add CAPs associated with registers having positive slack on both the input and the output to a first list of CAPs for which the clock signal can be advanced or delayed;

add CAPs associated with registers having positive slack on only the input to a second list of CAPs for which the clock signal can be advanced; and, add CAPs associated with registers having positive slack on only the output to a third list of CAPs for which the clock signal can be delayed.

15. The system of claim 9, the memory further storing instructions to cause the processor to convert the list of candidates to clock scheduling constraints for the EDA tool, the clock scheduling constraints serving as inputs to generate a refined timing and area optimized design for the logic circuit based on the clock skews.

16. The system of claim 11, the memory further storing instructions to cause the processor to build a clock tree for the logic circuit based on clock scheduling constraints.

17. A non-transitory computer readable storage medium storing instructions that, when executed by at least one processor, cause the at least one processor to:

determine a first design for a logic circuit;

determine a set of clock anchor points (CAPs) on a clock tree for the logic circuit based on the first design;

determine slack values on inputs and outputs of a plurality of groups of registers in the logic circuit;

schedule clock skews for the CAPs associated with the plurality of groups of registers by determining slack values for the inputs and outputs of the plurality of groups of registers;

add CAPS associated with groups of registers having positive slack values to a list of candidates;

generate a second design for the logic circuit based on the list of candidates; and utilize the second design as input to a clock tree synthesis module of an electronic design automation (EDA) tool.

18. The non-transitory computer readable storage medium of claim 17, the instructions to cause the at least one processor to advance or delay candidates on the list of candidates.

19. The non-transitory computer readable storage medium of claim 18, the instructions to cause the at least one processor to determine whether a clock signal for each CAP on the list of candidates should be advanced or delayed based on a maximum skew limit and a skew step.

20. The non-transitory computer readable storage medium of claim 17, instructions to cause the at least one processor to convert the list of candidates to clock scheduling constraints for the EDA tool, the clock scheduling constraints serving as inputs to generate a refined timing and area optimized design for the logic circuit based on the clock skews.

* * * * *